United States Patent [19]

Darm

[11] 4,140,175
[45] Feb. 20, 1979

[54] VERTICAL COUNTERFLOW HEAT EXCHANGER APPARATUS

[76] Inventor: William J. Darm, 5815 SW. Tucker, Beaverton, Oreg. 97005

[21] Appl. No.: 567,258

[22] Filed: Apr. 11, 1975

Related U.S. Application Data

[63] Continuation-in-part of Ser. No. 468,659, May 10, 1974, Pat. No. 3,905,850, and Ser. No. 473,512, May 28, 1974, Pat. No. 3,982,588.

[51] Int. Cl.$^2$ .................. F28B 9/00; F28D 3/04; F28D 9/00; F28F 3/00
[52] U.S. Cl. .................. 165/115; 165/165
[58] Field of Search .............. 165/165, 166, 118, 115, 165/95; 55/269; 122/39; 126/299 D, 299 E, 299 F

[56] References Cited

U.S. PATENT DOCUMENTS

| | | | |
|---|---|---|---|
| 912,868 | 2/1909 | Mey | 165/110 |
| 1,409,520 | 3/1922 | Bird | 165/166 |
| 1,645,481 | 10/1927 | Grell | 165/118 |
| 1,680,145 | 8/1928 | Forssblad | 165/95 |
| 1,894,026 | 1/1933 | Derry | 165/95 |
| 2,169,054 | 8/1939 | Mojonnier | 165/115 |
| 2,360,714 | 10/1944 | Payne | 165/118 |
| 2,634,164 | 4/1953 | Drake | 165/95 |
| 2,668,424 | 2/1954 | Mueller | 165/118 |
| 2,825,210 | 3/1958 | Carr | 165/115 |
| 2,826,045 | 3/1958 | Poffenberger | 165/115 |
| 3,371,709 | 3/1968 | Rosenblad | 165/165 |
| 3,381,747 | 5/1968 | Darm | 165/166 |
| 3,719,227 | 3/1973 | Jenssen | 165/166 |
| 3,995,688 | 12/1976 | Darm | 165/165 |

*Primary Examiner*—Charles J. Myhre
*Assistant Examiner*—Sheldon Richter
*Attorney, Agent, or Firm*—Klarquist, Sparkman, Campbell, Leigh, Hall & Whinston

[57] ABSTRACT

A counterflow heat exchanger is described with two sets of heat exchanger passages separated by heat exchanger plates disposed in substantial parallelism within the exchanger and supported so that the passages extend substantially vertically. The heat exchanger may be employed as an air-to-air or as an air-to-water heat exchanger and can be used to remove moisture or pollutants from hot exhaust air by condensation within the exchanger passages. When employed as an air-to-water heat exchanger, the water is sprayed onto the surfaces of the upper ends of one set of passages so that it flows down their length, while air is transmitted into the lower end of the other set of passages and caused to flow upward. The ends of the heat exchanger plates are split into two end portions which are joined to different exchanger plates on opposite sides thereof to form the two sets of passages which allow the air and water to flow in opposite directions through such passages for counterflow heat exchange by direct lateral transfer through the thickness of the exchanger plate. In making the exchanger, the exchanger plates are arranged in substantial parallelism and edges joined together with clips which tie the plates together as a unit bundle. A layer comprising a mixture of synthetic plastic resin and reinforcing material is prepared, and the unit bundle of plates is placed with a set of longitudinal edges of the plates in such layer. When the resin hardens, the layer forms a rigid slab extending along such set of edges which seals the edges to the heat exchanger housing with an air tight seal.

14 Claims, 5 Drawing Figures

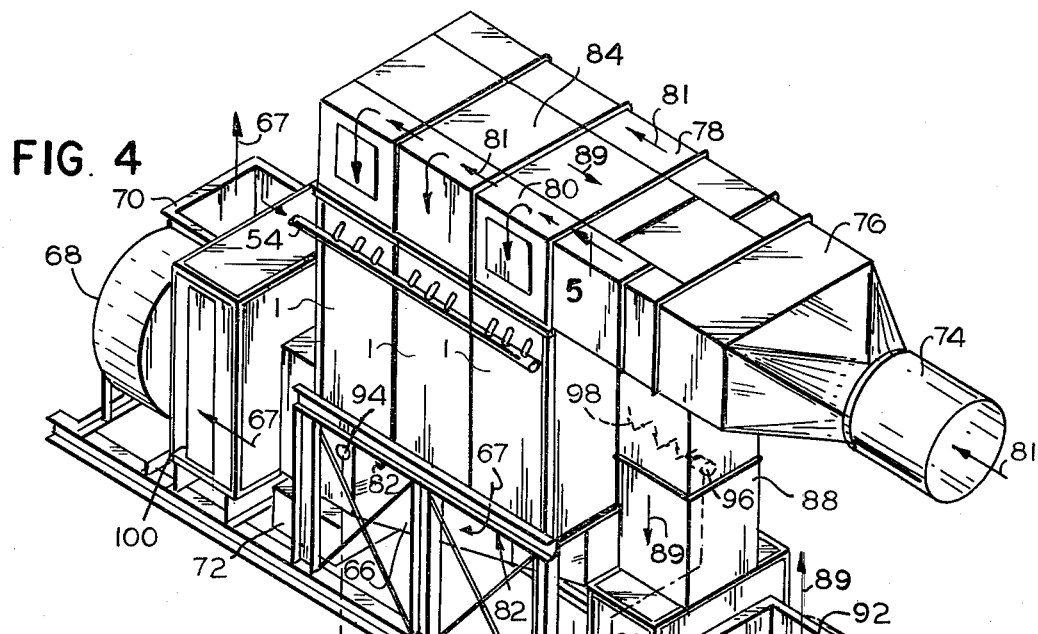
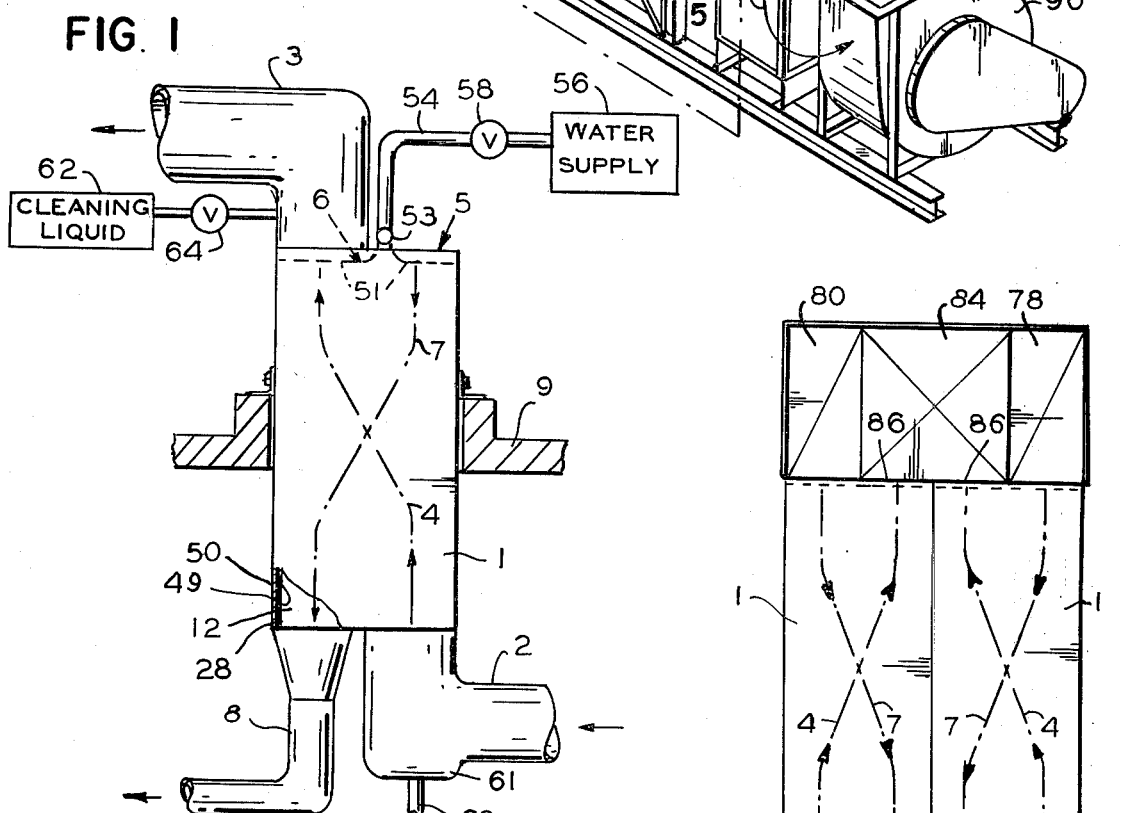
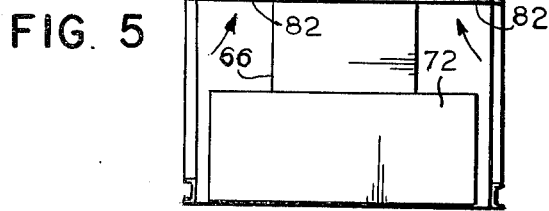

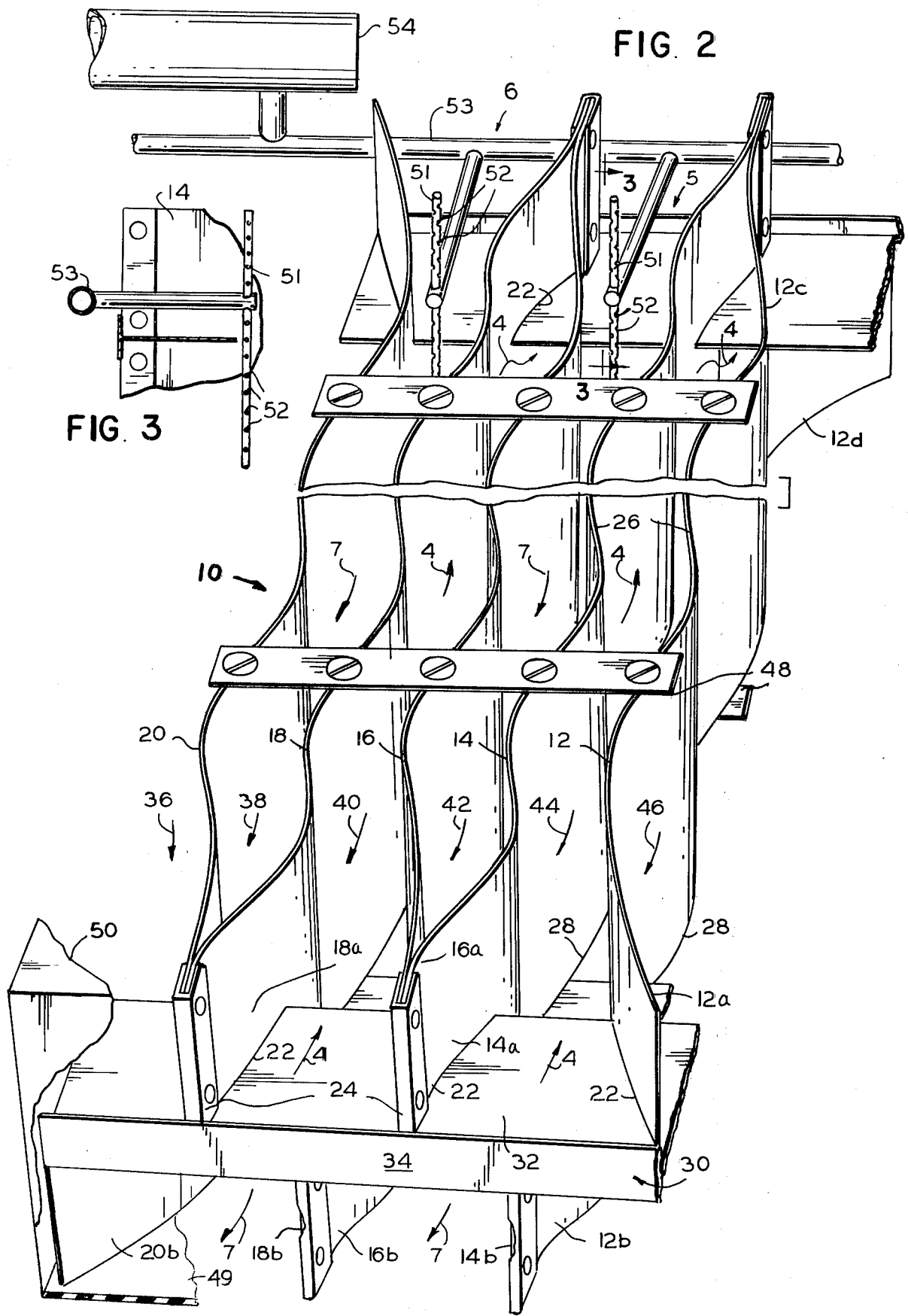

VERTICAL COUNTERFLOW HEAT EXCHANGER APPARATUS

REFERENCE TO RELATED APPLICATIONS

This application is a continuation-in-part of my prior filed U.S. patent applications Ser. No. 468,659, filed May 10, 1974, entitled "Air-to-Air heat Exchanger" now U.S. Pat. No. 3,905,850, and Ser. No. 473,512, filed May 28, 1974, entitled "Grease Collecting Heat Exchanger Installation", now U.S. Pat. No. 3,982,588.

BACKGROUND OF THE INVENTION

The instant invention relates generally to fluid heat exchanger apparatus adapted for exchange of heat between flowing streams of fluid, and in particular to vertical counterflow heat exchangers which can be employed as air-to-air or air-to-water heat exchangers. The present heat exchanger apparatus is especially useful in cooling hot exhaust air with cold water for energy conservation and condensation of air pollutants, in cooling hot water with cold ambient air, or in cooling hot ambient air with cold water for air conditioning.

The heat exchanger of the present invention is of the counterflow type including first and second sets of passages separated by heat exchanger plates. Such heat exchanger is supported so that the passages extend substantially vertically. When used as an air-to-water heat exchanger, water is sprayed onto the surfaces of the upper ends of one set of passages and flows down their length, while air is transmitted into the bottom ends of the other set of passages and flows up their length on opposite sides of the heat exchanger plates. This results in an extremely efficient heat exchange operation through the exchanger plates separating the two sets of passages.

It has been known to spray water into one set of passages in air-to-air heat exchanger, as shown in U.S. Pat. No. 1,409,520 of Bird and U.S. Pat. No. 2,825,210 of Carr. In the former patent the heat exchanger is horizontal and the water is sprayed in the outlet end of one set of air passages so that the water does not flow down the length of the passages. In the latter patent the heat exchanger plates are supported by rubber spacers which separate the two different sets of passages so that there is no appreciable direct lateral transfer of heat through the thickness of the separating members in the manner of the counterflow heat exchanger of the present invention.

The present air-to-water heat exchanger apparatus has the advantage that the exit temperature of the air being cooled or of the water being heated can be easily controlled by adjusting the water flow or air flow with a valve or damper which may be automatically operated by a temperature sensor. Another advantage is that the apparatus is reversible and can also be used for cooling hot water and warming cold air without modifications in the heat exchanger. In addition, the high latent heat of steam or moist exhaust air can be recovered by transfer to clean water flowing through other passages in the exchanger for heating buildings or other uses.

Finally, hydrocarbon vapors and other air pollutants can be removed from hot exhaust air by condensing such pollutants within the passages of the heat exchanger. When the condensed pollutants remain in a liquid state, they will run down the vertical passages and out of the exchanger apparatus through a drain. However, if such condensed pollutants tend to solidify as a deposit on the surfaces of the passages, they may be removed by injecting solvents or cleaning agents into the air flowing through such passages. In addition, solid particle pollutants can be removed from the air by depositing water or a more viscous liquid, such as oil, on the surface of the passages to collect impinging particles and remove them with the collecting liquid.

Counterflow heat exchangers have been proposed, such as in my earlier U.S. Pat. No. 3,381,747, comprising a series of heat exchanger plates disposed within a housing defining a multiplicity of channels or passages extending side-by-side along the housing and constructed so that fluid flowing in alternate ones of the channels exchanges heat with the fluid flowing in the remainder of the channels. To be efficient, the exchanger plates defining such channels should have large surface expanses exposed to the fluids passing through the exchanger. Toward these ends, I have found that thin metallic sheets of considerable width, and preferably corrugated to increase the turbulence of fluids passing through the exchanger, may be utilized in producing a highly satisfactory exchanger of many types of applications. In addition the heat exchanger of the present invention further differs from that of my earlier patent and the non-counterflow heat exchanger of U.S. Pat. No. 3,371,709 of Rosenblad by its simple and economical split end construction. Thus, the ends of the heat exchanger plates are split into two end portions which are joined to different exchanger plates on opposite sides thereof to form the two sets of passages. This provides a more efficient heat exchanger which is capable of handling an extremely large amount of air flow in the range of hundreds of thousands of cubic feet per minute.

In the manufacture of such an exchanger, because of the flexible nature of the plates or sheets making up the exchanger plates, and the great number of plates which ordinarily make up a typical exchanger, there are certain problems presented in assembling the unit with the plates properly positioned in a permanent manner within the exchanger, and with the completed unit having the desired strength and rigidity. To be kept in mind also is any method utilized in making the exchanger should be one which lends itself to be performed without the need of using highly trained personnel, and in a quick and expeditious manner. These problems are overcome by the present invention.

SUMMARY OF INVENTION

Generally, therefore, an object of this invention is to provide a new and improved counterflow heat exchanger of simple and efficient operation having two sets of passages separated by heat exchanger plates which transfer heat laterally through the thickness of such plates.

A further object of the invention is to provide such a heat exchanger of simple and economical construction including heat exchanger plates whose ends are split into two end portions which are joined to different exchanger plates on opposite sides thereof to form the first and second sets of passages.

Another object of the invention is to provide such a heat exchanger in which the two sets of passages are supported so that they extend substantially vertical and water is applied to the surfaces of one set of passages adjacent their top ends to cause the water to flow downward therein while air is transmitted into the bottom ends of the other set of passages and caused to flow upward therein to provide an air-to-water heat exchanger of high efficiency which is capable of exchanging the heat in vast amounts of air and water at a fast rate.

An additional object of the invention is to provide such a heat exchanger apparatus in which the temperature of the air or water can be precisely controlled by adjusting the amount of heating or cooling fluid flowing through such exchanger, and which is reversible for heating or cooling the air or water.

Still another object is to provide such a heat exchanger which can be used for condensing water or pollutants from the air onto the surfaces of the heat exchanger passages and for removing the condensed water or pollutants from the heat exchanger in a simple effective manner.

BRIEF DESCRIPTION OF DRAWINGS

These and other objects and advantages of the invention will become more fully apparent from the following description of a preferred embodiment thereof and from the accompanying drawings thereof, wherein:

FIG. 1 is a diagrammatic elevation view illustrating an air-to-water heat exchanger apparatus made in accordance with one embodiment of the present invention, with parts of the exchanger housing broken away for clarity;

FIG. 2 is a prespective view of a portion of the assembly of heat exchanger plates and associated water sprayer provided in the heat exchanger apparatus of FIG. 1;

FIG. 3 is a horizontal section view taken along the line 3—3 of FIG. 1;

FIG. 4 is a perspective view of an air-to-air heat exchanger apparatus in accordance with another embodiment of the invention; and FIG. 5 is a vertical section view taken along the line 5—5 of FIG. 4.

DETAILED DESCRIPTION OF PREFERRED EMBODIMENTS

A preferred embodiment of the heat exchanger apparatus of the present invention is the air-to-water heat exchanger apparatus shown in FIG. 1 and includes a counterflow type of heat exchanger 1. The heat exchanger includes a housing containing an assembly of heat exchanger plates shown in FIG. 2 which form a first set and a second set of fluid passages separated by the exchanger plates in a manner hereafter described. Heat exchanger 1 is supported so that the passages extend substantially vertically between top and bottom ends. The bottom ends of one set of passages are connected to an air inlet conduit 2 which transmits air into such inlet from any source, such as a source of hot humid exhaust air having a temperature of, for example, 180° F. dry bulb and 140° F. wet bulb. The top ends of such one set of passages are attached to an air outlet conduit 3 which discharges the air to the atmosphere after it is cooled in the heat exchanger 1 while flowing upward through the one set of passages in the direction of arrows 4. Much of the moisture in the air condenses on the surfaces of the passages and flows downward out of the heat exchanger apparatus through a drain. As a result, the discharged air at outlet 3 is also of lower humidity and may have a temperature of 60° F. dry bulb and 60° F. wet bulb.

The other set of passages in the heat exchanger have their top ends employed as water inlets 5 by providing a water sprayer 6 either outside of the heat exchanger and above the water inlets or inside the heat exchanger within such inlets. Water is sprayed onto the surfaces of such other set of passages by sprayer 6 adjacent the top ends thereof and is caused to flow downward in the direction of arrows 7 along such surfaces provided by one side of the heat exchanger plates. When cooling hot exhaust air, cold water of, for example, about 40° F. is delivered to the heat exchanger by sprayer 6 and hot water of, for example, about 140° F. is discharged into a water outlet conduit 8 to the bottom ends of the other set of passages. As shown in FIG. 1, the heat exchanger 1 is supported in a vertical position and may extend through a hole in the roof 9 of a building containing the source of the hot exhaust air.

The heat exchanger plate assembly 10 within the exchanger is shown in FIG. 2 and includes a plurality of exchanger plates 12, 14, 16, 18, and 20. The plates are arranged in the assembly in substantial parallelism. Each of the plates has a length conforming substantially to the length of the exchanger with which the assembly is to be incorporated. The plates further may be provided with corrugations extending transversely of the plates, whereby any fluid, liquid or gas, moving through the exchanger is given a degree of turbulence.

Each of the plates at each of its ends is split with a cut 22 extending longitudinally of the plate. The cut parallels the longitudinal edges 26 and 28 of the plate, and normally is made about mid-way between the longitudinal edges, thus to divide the end of each plate into a pair of end portions or tongue segments, exemplified by tongue segments 12a and 12b, of equal width.

The tongue segments of each exchanger plate end are shown bent in reverse directions. Thus tongue segment 12a, as shown in FIG. 2, is bent to curve outwardly (where it will meet with the housing of the exchanger which is assembled about the core element) and tongue segment 12b below segment 12a is bent to curve inwardly. Considering exchanger plate 14, its upper tongue segment 14a is bent inwardly, whereas its lower tongue segment 14b is bent outwardly to meet tongue segment 12b. Where adjacent ends of tongue segments meet, they may be fixed together using an overlying angle piece, such as angle piece 24, secured in place as by crimping.

It will be noted that whereas the upper tongue segment 12a of plate 12 is bent outwardly, and the lower one 12b is bent inwardly, at the opposite end of the exchanger plate the upper tongue segment 12c is bent inwardly whereas the lower one is bent outwardly. This same relationship holds true for the tongue segment at each set of ends of an exchanger plate. A divider member shown at 30, including a horizontal wall expanse 32 and a vertical marginal flange 34, may be inserted into cuts forming the tongue segments, at each set of ends of the exchanger plates. The divider member, when positioned as shown in FIG. 2, serves to separate end portions of channels defined on opposite sides of the various plates. Thus, and considering channel 40 in FIG. 2, the divider separates this channel where such is defined between tongue segments 18a, 16a, from portions of channels 38 and 42 below the divider, defined between tongue segments 20b, 18b, and 16b, 14b respectively.

As shown in FIG. 2, one set of passages or channels 36, 40, and 44, at the end of the assembly pictured at the bottom of FIG. 2, open to the end of the assembly above the divider. At the opposite end of the assembly these channels open up to the end of the assembly below the divider. The reverse is true for the other set of passages or channels 38, 42, and 46, which at the end of the assembly pictured at the bottom of FIG. 2, open to the end of the assembly below the divider, and at the opposite end of the assembly, open to the end of the assembly above the divider.

With the arrangement, and assuming the presence of an encompassing casing, it should be obvious that one set of channels may be utilized for the passage of one body of fluid through the exchanger, and an alternating set for the passage of another body of fluid through the exchanger, with such bodies of fluid passing through multiple flow paths interspersed with each other.

In making an exchanger with a core element of the type described, and when it is remembered that tyipcally a far greater number of exchanger plates are utilized than actually pictured in FIG. 2, it should be obvious that a problem arises with respect to positioning properly the adjacent exchanger plates where they extend in expanses between the ends of the plates. The plates usually are made of thin metal, and if corrugated transversely of their lengths, have considerable flexibility in a transverse direction. Further, they are easily twisted, Obviously, if the plates are not properly oriented in the completed exchanger with substantially uniform spacing existing between them where they extend throughout their length, the efficiency of the exchanger is affected.

Thus, according to this invention, the various exchanger plates are arranged substantially as pictured in FIG. 2. During assembly, and to tie the various exchanger plates together, typing clips 48, which may be metal strips attachable to the edges of the plates, are assembled with the plates by fixedly attaching them to the edges of the plates at regions spaced along the length of the assembly. The clips are attached to each of the opposite sets of adjacent edges in the plate assembly. The tying clip 48 specifically illustrated has slotted depressions formed in it, the slots receiving edge portions of the plates which may be twisted slightly after being passed through the slots to hold the clip in place. The exchanger plates are also fastened together at their ends through joinder of the tongue segments with angle pieces 24.

As a next step in the manufacture of the exchanger, a set of adjacent longitudinal edges 26 or 28 in the exchanger plate assembly 10 is permanently fixed by embedding or encasing the edges in a resin slab 49. In preparing such a slab, reinforcing material, such as a fiberglass sheet, is laid down along the interior of a section of the metal housing 50 of the heat exchanger. Poured over this sheet is a mass of uncured, hardenable synthetic plastic resin material 49, such as a liquid epoxy resin, which is a theremosetting resin that cures to form a hard mass. The resin impregnates the reinforcing sheet, and the resin and sheet form a hardenable layer on the inner surface of the housing section. The housing section, which may be made of sheet metal, constitutes a form confining the resin layer during this stage of the manufacture.

The assembly of exchanger plates may then be fitted within the housing section, with a set of edges 26 or 28 of the plates, as well as any tying strips 48 connecting these edges, then pressed downwardly to be sunk into the layer 49 of resin and reinforcing material. After a period of time, on curing of the resin mass, a strong, rigid slab 49 of synthetic plastic results which bonds the longitudinal edges of the heat exchanger plates to the housing 50. Such slab seals the edges of the plates, and provides insulation along one side of the exchanger, as well as forming a rigid structural element along one side of the plate assembly.

This operation may then be repeated by preparing in another housing section another layer of resin and reinforcing material similar to the one just described. The assembly of exchanger plates may then be inverted, and the edges in the opposing set of edges of the plates, together with tying strips, sunk into this layer of material. On hardening, another rigid slab is thus prepared encasing the edges of the opposing set, and forming a rigid unit of slab and various exchanger plates.

An article prepared as above includes the core element of assembled exchanger plates, having cured slabs of reinforced resin uniting and sealing the edges in the opposed set of edges of the plates. Encompassing the slabs a resinous material, and portions of the sides of the exchanger plate assembly, are housing sections which are joined together to form the completed housing.

As shown in FIGS. 2 and 3, the sprayer means 6 may include a plurality of pairs of sprayer pipes 51 provided in each of the water passages 38, 42, and 46 extending across their width adjacent the upper ends thereof. The sprayer pipes 51 spray water onto the surfaces of such passages adjacent their top ends through spray openings 52 spaced along such pipes. The water flows down the length of such passages in the direction of arrows 7 since they are supported in a vertical position. The sprayer pipes 51 may be of about $\frac{1}{4}$ inch diameter and are connected to larger header pipes 53 of one inch diameter which in turn are connected to a main line pipe 54 of 4 inch inner diameter. The main line pipe 54 is connected to a water supply 56 through a valve 58. The water supply may be connected to the output of a water cooling tower whose input is connected to the water outlet conduit 8 of the heat exchanger to reuse the water after it has been cooled. The valve 58 may be automatically or manually adjusted to vary the flow of water through the heat exchanger and thereby control the temperature of the air discharged from such exchanger through conduit 3.

In addition, the heat exchanger apparatus of FIG. 1 can be provided with a drain pipe 60 connected to a collecting basin 61 in the bottom of the air inlet conduit 2 to drain off any condensed water or pollutants, such as carbonaceous vapors which condense from the exhaust air as liquids onto the surfaces of the heat exchanger passages through which the exhaust air flows. Thus, some of the air pollutants may be chemical solvents which after condensing in the heat exchanger run down the heat exchanger plates and are recovered through the drain 60. In order to clean the surface of the heat exchanger plates and remove solids deposited on such plates, a source of cleaning liquid 62 is connected through a valve 64 to the air outlet conduit 3 at the top end of the air passages of the heat exchanger. Thus cleaning liquid is periodically injected into the conduit 3 and flows down the surfaces of the air passages for cleaning. Alternatively, the cleaning liquid can be evaporated into the hot air and transmitted into the inlet conduit 2 so that such cleaning liquid condenses on the surface of the first set of heat exchanger passages as the air flows upward in the direction of arrows 4. The condensed cleaning liquid flows downward along the surfaces of the first passages and removes any solids deposited on such surfaces. The condensed cleaning liquid is collected in the basin 61 and is transmitted through the drain 60 to a suitable evaporator (not shown) for reevaporating it into the hot air stream to provide a continuous cleaning operation.

FIGS. 4 and 5 show another embodiment of the vertical counterflow heat exchanger apparatus of the present invention including a plurality of heat exchanger units 1 similar to that previously described in FIGS. 1 and 2. The heat exchanger units 1 are supported in two rows so that the passages within such heat exchangers extend substantially vertically. As shown in FIG. 5, cool ambient air flows upward in the direction of arrows 4 through one set of passages and hot exhaust air flows downward in the direction of arrows 7 through the other set of passages. The two sets of passages are separated from each other by the heat exchanger plates as shown in FIG. 2.

In the preferred embodiment, the heat exchanger apparatus of FIGS. 4 and 5 is employed to cool and condense pollutants from hot contaminated exhaust air such as is emitted by a wood veneer dryer. The cold ambient air cools the hot exhaust air as it passes downward through the heat exchanger and causes carbonaceous vapors and other gaseous pollutants contained within the exhaust air to condense onto the surfaces of the heat exchanger passageways. The condensed pollutants are deposited as liquids onto the surfaces of the heat exchanger plates so that they drain down such heat exchanger plates by gravity into an exhaust air collection duct 66 extending horizontally along the bottoms of the heat exchanger units. The exhaust air is sucked from the bottom end of the heat exchangers in the direction of arrows 67 through duct 66 by an exhaust air fan 68 to an exhaust discharge 70 which may be connected to a suitable exhaust stack (not shown) which opens to the atmosphere. As a result of the suction of the exhaust fan, a slightly negative pressure is produced in duct 66 and the exhaust air passages of the heat exchanger units 1 and the exhaust air input ducting to such exchanger. The bottom of the exhaust duct 66 slopes downwardly to a collection tank 72 where the liquid pollutants are collected for periodic removal.

The contaminated exhaust air is transmitted into the apparatus of FIG. 4 through an exhaust inlet duct 74. A filter section 76 is provided in the inlet duct to filter solid particles from the exhaust air before it is transmitted to a pair of side ducts 78 and 80 extending horizontally across the top ends of the two rows of heat exchanger units. The exhaust air is transmitted through side ducts 78 and 80 in the direction of arrows 81 and downward through the heat exchanger units.

Cold, clean ambient air is transmitted from the atmosphere upward through inlet opening 82 in the bottom ends of the heat exchanger units 1 and the heated clean air is discharged into a central duct 84 through outlet openings 86 at the top ends of such heat exchanger units, as shown in FIG. 5. The central duct 84 extends horizontally between the two side ducts 78 and 80 across the top ends of the heat exchanger units and connects to a vertical duct 88. The heated clean air is sucked through ducts 84 and 88 in the direction of arrows 89 by another air fan 90 connected between the bottom of duct 88 and clean air discharge 92, which may be connected by suitable ducting (not shown) back to the veneer dryer or to the heating system of a building. This result in a considerable savings in heating costs since approximately 70% of the heat in the exhaust air is recovered by heat transfer in the heat exchangers to the clean air.

In order to control the temperature of the exhaust air emitted from the output of the heat exchanger units 1, a temperature sensor 94 is located at the output of the exhaust air collector duct 66 and is electrically connected to a solenoid 96 or other actuating means which controls the opening and closing of a damper mechanism 98 provided in the path of the clean air, such as in the vertical duct 88. As a result, the flow of clean air through the vertical duct and the heat exchangers is automatically changed to vary the amount of cooling of the exhaust air in order to maintain the final temperature of the exhaust air at the output of the heat exchangers at a predetermined temperature of, for example, 150° F. This is necessary, among other reasons, to maintain the condensed pollutants in a liquid state so they run down the surfaces of the heat exchanger passages and duct 66 into the collection tank 72.

Typical temperatures of the exhaust air and clean air before and after heat exchange are as follows. The exhaust air temperature is about 340° F. at inlet 74 and 150° F. at the outlet of duct 66. The clean air temperature is at an ambient level of, for example, 70° F. at inputs 82 and about 260° F. at discharge 92 because of the heat exchange increase in temperature of about 190° F.

As a result of the drop in temperature of the exhaust air from 340° F. to 150° F., substantially all carbonaceous vapors and other gaeous pollutants in the exhaust air are condensed onto the heat exchanger passageways and very little pollutants are transmitted into the atmosphere through the exhaust discharge 70 so that in many cases no further pollution abatement equipment is necessary. However, a demister apparatus 100 is employed connected between the output of the exhaust air collection duct 66 and the exhaust fan 68. The demister apparatus is of conventional type which contains a plurality of baffles for changing the direction of the air flow in order to remove any particles of liquid or mist of condensed water or pollutants from the exhaust air which are not deposited on the surfaces of the heat exchangers or duct 66. The demister also drains into the collection tank 72.

The heat exchanger passages through which the exhaust air is conducted downward in the direction of arrow 7 may be cleaned by spraying clean liquid into such passageways through the pipe line 54 into the sprayers 51, in a similar manner to that shown in FIGS. 1 and 2. Thus, instead of spraying water for condensing purposes as in FIG. 1, the sprayer apparatus 6 can be employed to spray cleaning liquid or steam for removing condensation solids and other deposits from the surface of the exhaust air passages.

It will be obvious to those having ordinary skill in the art that many changes may be made in the details of the above-described preferred embodiment of the present invention without departing from the spirit of the invention. For example, the exhaust gas can flow upward in direction 4 while ambient air or cold water flows downward in direction 7 in FIG. 5, merely by moving side ducts 78 and 80 to the lower ends of the heat exchangers and providing the fluid inlets 82 at the top ends of such exchangers. In this case the duct 84 would discharge the exhaust air and liquid drain means like 60 and 61 of FIG. 1 would be provided in the lowered side ducts 78 and 80 to remove the condensed pollutants, while duct 66 would be used to discharge the heated ambient air or water. Therefore, the scope of the present invention should only be determined by the following claims.

I claim:

1. A gas-liquid heat exchanger apparatus comprising:
counterflow heat exchanger means including a first set and a second set of heat exchanger passages separated from each other by heat exchanger plates in heat exchanging relationship with said first and second passages on opposite sides thereof, both sets of said first and second passages extending completely through the heat exchanger between inlets and outlets;
support means for supporting the heat exchanger means so that said passages extend substantially vertically between their top ends and bottom ends;
gas transmission means for transmitting hot gas into said inlets at the bottom ends of the first passages and causing said gas to flow upward through said first passages out of said outlets at their top ends; and
liquid sprayer means fixed in position for spraying cooling liquid directly onto the surfaces of the heat exchanger plates in the second passages adjacent the top ends thereof and cause said liquid to flow downward by gravity as a thin film through said second passages along said surfaces and out of outlets at their bottom ends so that said liquid and said gas flow in opposite directions along the surfaces on opposite sides of the same portion of one of said heat exchanger plates for direct counterflow heat exchange laterally through the thickness of said plates in order to cool said gas sufficiently to cause a portion of such gas to condense on the surfaces of said first passages.

2. A heat exchanger apparatus in accordance with claim 1 in which the liquid sprayer means includes water sprayer means mounted outside the heat exchanger passages above the upper ends of the second passages.

3. A heat exchanger apparatus in accordance with claim 1 in which the sprayer means is mounted within the heat exchanger and includes a plurality of perforated sprayer tubes extending across the top ends of the second passages.

4. A heat exchanger apparatus in accordance with claim 1 in which the gas transmission means transmits heated air into the first passages and the liquid sprayer means transmits cold water into the second passages.

5. A heat exchanger apparatus in accordance with claim 4 in which the heated air is of high humidity so that at least a portion of the moisture in said air condenses on the surface of the first passages and the condensed water is removed from the heat exchanger by a drain means connected to the bottom end of the first passages.

6. A heat exchanger apparatus in accordance with claim 4 in which the heated air contains pollutants that are cooled sufficiently to condense on the surfaces of the first passages, and which includes means for removing the condensed pollutants from the heat exchanger.

7. A gas-liquid heat exchanger apparatus comprising:
counterflow heat exchanger means including a first set and second set of heat exchanger passages separated from each other by heat exchanger plates in heat exchanging relationship with said first and second passages, said heat exchanger plates having their ends split into two end portions which are joined to different heat exchanger plates on opposite sides thereof to form said first and second passages;
support means for supporting the heat exchanger apparatus so that said passages extend substantially vertically between top ends and bottom ends;
first transmission means for transmitting a first fluid into the bottom ends of the first passages and causing said first fluid to flow upward through said first passages, said first fluid being a gas; and
second transmission means for transmitting a second fluid into the top ends of the second passages and cause said second fluid to flow downward through said second passages along said surfaces, said second fluid being a liquid.

8. A heat exchanger apparatus in accordance with claim 7 in which the first and second fluids include an air stream of heated exhaust air containing gaseous pollutants which are cooled sufficiently by the other fluid to condense on the surfaces of one set of passages in the heat exchanger as liquid pollutants which flow down said one set of passages and out of the heat exchanger.

9. A heat exchanger apparatus in accordance with claim 7 in which the first fluid is air and the second fluid is water.

10. A heat exchanger apparatus in accordance with claim 9 in which the second transmission means is a water sprayer means including a plurality of perforated sprayer tubes mounted within the heat exchanger and extending across the top ends of the second passages.

11. A heat exchanger apparatus in accordance with claim 9 in which the first transmission means transmits heated air into the first passages and the second transmission means transmits cold water into the second passages.

12. A heat exchanger apparatus in accordance with claim 11 in which the heated air is of high humidity so that at least a portion of the moisture in said air condenses on the surface of the first passages and the condensed water is removed from the heat exchanger by a drain means connected to the bottom end of the first passages.

13. A heat exchanger apparatus in accordance with claim 11 in which the heated air contains gaseous pollutants that are cooled sufficiently by the cold water to condense on the surfaces of the first passages as liquid pollutants which flow down said first passages and out of the heat exchanger.

14. A heat exchanger apparatus in accordance with claim 13 which also includes cleaning means for transmitting cleaning fluid into the one set of passages for removing any solid material which is deposited on the surfaces of said one passages.

* * * * *

UNITED STATES PATENT AND TRADEMARK OFFICE
CERTIFICATE OF CORRECTION

PATENT NO. : 4,140,175
DATED : February 20, 1979
INVENTOR(S) : William J. Darm

It is certified that error appears in the above-identified patent and that said Letters Patent are hereby corrected as shown below:

```
Column 2, line 23, "of" should be --for--
Column 4, line 13, after "conduit 8" insert --connected--
          line 53, "segment" should be --segments--
Column 5, line 17, "tyipcally" should be --typically--
          line 34, "typing" should be --tying--
Column 6, line 20, after "slabs" change "a" to --of--
          line 32, before "diameter" insert --inner--
          line 34, before "diameter" insert --inner--
Column 7, line 21, "polluants" should be --pollutants--
          line 54, "opening" should be --openings--
          line 67, "result" should be --results--
Column 8, line 30, "gaeous" should be --gaseous--
Column 9, line 52, "surface" should be --surfaces--.
```

Signed and Sealed this

First Day of April 1980

[SEAL]

Attest:

SIDNEY A. DIAMOND

*Attesting Officer*     *Commissioner of Patents and Trademarks*